United States Patent [19]
Vandevoorde et al.

[11] Patent Number: 6,096,835
[45] Date of Patent: Aug. 1, 2000

[54] FILM FORMING BINDER FOR COATING COMPOSITIONS AND COATING COMPOSITIONS COMPRISING SAME

[75] Inventors: Paul Vandevoorde, Essen, Belgium; Antonius Hendrikus Gerardus Van Engelen, Troy, Mich.

[73] Assignee: Akzo Nobel N.V., Arnhem, Netherlands

[21] Appl. No.: 09/292,728

[22] Filed: Apr. 15, 1999

Related U.S. Application Data

[63] Continuation of application No. PCT/EP97/05713, Oct. 15, 1997.

[51] Int. Cl.$^7$ ..................................................... C08F 20/00
[52] U.S. Cl. ........................... 525/440; 525/443; 525/454; 524/539
[58] Field of Search .................................... 525/440, 443, 525/454

[56] References Cited

U.S. PATENT DOCUMENTS

| | | | |
|---|---|---|---|
| 4,410,667 | 10/1983 | Porter, Jr. et al. | 525/440 |
| 4,410,668 | 10/1983 | Piccirilli et al. | 525/440 |
| 4,859,743 | 8/1989 | Ambrose et al. | 525/443 |
| 4,859,791 | 8/1989 | Nodelman et al. | 560/91 |
| 5,468,802 | 11/1995 | Wilt et al. | 524/539 |

FOREIGN PATENT DOCUMENTS

| | | | |
|---|---|---|---|
| 91685/82 | 8/1983 | Australia | C09D 3/66 |
| 252 346 | 1/1988 | European Pat. Off. | C08G 18/79 |
| 409 300 | 1/1991 | European Pat. Off. | C08G 18/32 |
| 409 301 | 1/1991 | European Pat. Off. | C08G 18/32 |
| 455 291 | 11/1991 | European Pat. Off. | C08G 18/32 |
| 530 806 | 3/1993 | European Pat. Off. | C08G 18/38 |
| 561 152 | 9/1993 | European Pat. Off. | C09D 167/00 |
| 1037941 | 8/1966 | United Kingdom | C08G 21/02 |
| 96/02585 | 2/1996 | WIPO | C08G 18/42 |

OTHER PUBLICATIONS

Derwent Abstract 009572049.
Derwent Abstract 007373887.

*Primary Examiner*—Patricia A. Short
*Attorney, Agent, or Firm*—Joan M. McGillycuddy

[57] ABSTRACT

The current invention provides a film forming binder comprising 45 to 99 wt. % of a polyester polyol comprising cycloaliphatic moieties, and 55 to 1 wt. % of a polyurethane polyol comprising cyclic moieties, where the Tg of the polyurethane polyol is higher than the Tg of the polyester polyol.

Also disclosed are coating compositions comprising such film forming binders and a crosslinker, a process for the curing of such coating compositions, and the use of such coating compositions on substrates.

21 Claims, No Drawings

FILM FORMING BINDER FOR COATING COMPOSITIONS AND COATING COMPOSITIONS COMPRISING SAME

This is a continuation of International Application No. PCT/EP97/05713, with an international filing date of Oct. 15, 1997, designating the United States of America, now abandoned.

The present invention relates to film forming binders for coating compositions, coating compositions, particularly high solids coating compositions, comprising such binders, a process for the curing of such coating compositions, and the use of such coating compositions on substrates.

BACKGROUND OF THE INVENTION

Many of the high solids automotive coatings presently in use are based upon polymeric systems comprised of a binder comprising either polyester-based or polyacrylic-based polyols and crosslinking agents therefor. These coatings are generally supplied as "one-pack" or "two-pack" systems.

In a typical one-pack system, all of the coating ingredients are combined into one storage-stable mixture. Upon application, the polyol component is crosslinked, generally with an aminoplast resin (such as a melamine resin) or a blocked isocyanate, usually under heat cure conditions of 120° C. or above. In a typical two-pack system, the polyol component is combined with a crosslinking agent, generally an isocyanate, shortly before application, with curing being conducted at ambient and/or elevated temperatures.

For environmental reasons, it is becoming increasingly important to develop polymeric systems with low solution viscosities, which permit the formulation of high solids coatings with low application viscosities suitable for spraying. High solids coatings (generally 50 wt. % or greater solids) significantly decrease the amount of volatile organic compounds (VOC) entering the atmosphere upon drying/curing of the coating.

Further, in a typical vehicle coating refinish operation, after applying the coating to the vehicle, the resulting finish is allowed to dry before the vehicle is moved. Before any further work can be done to the finish, it must be tack free so that dust and dirt will not stick to it. It must also be hardened sufficiently to allow polishing to improve gloss and/or remove minor imperfections. Conventional high solids refinish coating compositions have long drying and curing times, and, therefore, reduce the productivity of a refinish operation since the vehicles cannot be moved and worked on quickly after application of the finish.

WO 96/02585 describes a coating composition based on a polyester polyol, especially applicable in the automotive refinish industry. It has been found that such a refinish coating composition has long drying and curing times and, therefore, has the above-mentioned disadvantage of the reduction of the productivity of a refinish operation since the vehicles cannot be moved and worked on quickly after application of the finish. AU 91685/82 (equivalent of U.S. Pat. No. 4,419,407) discloses a thermosetting coating composition comprising a polyester polyol having cyclic moieties and a polyurethane polyol. The polyurethane polyol in this publication is a reaction product of a high molecular weight polyol and a polyisocyanate compound. The Tg of the polyurethane polyol is lower than the Tg of the polyester polyol. The polyurethane polyol thus acts as a plasticizer. Accordingly, the coating compositions dry slowly and produce flexible but soft films. Similar coating compositions are described in U.S. Pat. No. 4,859,473, U.S. Pat. No. 4,410,667, and U.S. Pat. No. 4,410,668.

European patent application 0 561 152 discloses a coating composition comprising a polyester polyol and, optionally, a polyurethane polyol. This polyurethane polyol is only exemplified as a reaction product of a polyamine and a carbonate having a hydroxyl number of 400 to 800. The polyurethane polyol acts as a reactive diluent.

Furthermore, publications have been located disclosing coating compositions comprising polyurethane polyols but not polyester polyols: EP-A-0 530 806, EP-A-0 409 300, EP-A-0 409 301, and EP-A-0 455 291. Finally, U.S. Pat. No. 4,859,791 and GB 1,037,941 describe coating compositions comprising polyester polyols but not in combination with a polyurethane polyol.

SUMMARY OF THE INVENTION

It is an object of the present invention to overcome the shortcomings of the above-mentioned coating compositions and to provide a high solids coating composition that dries in a relatively short period of time to a hard finish, allowing the vehicle to be moved and the finish to be polished, if necessary, to remove minor imperfections and enhance gloss, thus improving the efficiency of a refinish operation by allowing more vehicles to be processed in the same or in less time.

Accordingly, the present invention provides a film forming binder comprising:

(1) 45 to 99 wt. % of a polyester polyol comprising cycloaliphatic moieties, and (2) 55 to 1 wt. % of a polyurethane polyol comprising cyclic moieties, with the proviso that the Tg of the polyurethane polyol is higher than the Tg of the polyester polyol.

The present invention also provides coating compositions, preferably high solids coating compositions, comprising the above-described film forming binders of the above-described type, and a crosslinker. Further, the present invention provides a refinish coating composition, particularly suitable for vehicle refinishing. Also provided is a process for curing the coating compositions of the current invention.

Surprisingly, in the current invention it has also been found that although the Tg of the polyurethane polyol is higher than the polyester polyol large amounts of solvent are not needed to lower the viscosity of the coating composition. Accordingly, a high solids coating composition can be obtained.

DETAILED DESCRIPTION OF THE INVENTION

Preferably, the film forming binder according to the current invention comprises a branched polyester polyol. More preferably, the branched polyester polyol is the reaction product of (a) at least one cycloaliphatic polycarboxylic acid or derivatives thereof, (b) at least one $C_{3-12}$ triol, and (c) optionally, one or more monoalcohol, polyol, aromatic polycarboxylic acid, acyclic aliphatic polycarboxylic acid, monocarboxylic acid or glycidyl ester of monocarboxylic acid.

Particularly suitable polyester polyols for film forming binders and coating compositions of the present invention have a molecular weight (Mn) ranging from 500 to 3000, preferably from 750 to 2500, as determined by gel permeation chromatography using polystyrene or polypropylene glycol as a standard. The degree of molecular dispersion, i.e., the ratio of Mn to Mw, preferably is in the range of 1.1 to 5, ranges from 1.5 to 3 being preferred particularly. The acid value of the polyester polyol is preferably below 30, most preferably below 20. Suitable hydroxyl values are in the range of 75 to 300, preferably 100 to 250.

Preferably, the Tg of the polyester polyol ranges from −20 to 20° C., more preferably −10 to 10° C., and the Tg of the polyurethane polyol ranges from 10 to 100° C., more preferably 20 to 90° C. The Tg is measured as explained in the Examples. The difference in Tg between the Tg of the polyurethane polyol and the Tg of the polyester polyol is preferably at least 10° C., more preferably at least 20° C., most preferably at least 30° C.

Preferably, the film forming binder comprises 50 to 95 wt. % of the polyester polyol, more preferably 65 to 90 wt. %, and 50 to 5 wt. % of the polyurethane polyol, more preferably 35 to 10 wt. %.

The polyester polyols are prepared using conventional techniques. The reactants and the molar ratios of the reactants are chosen in such a way that they provide a reaction product having a number of residual hydroxyl groups. Typically, the polyester polyols are formed by charging the carboxylic and hydroxylic components in a suitable polymerization vessel and heating the reaction mixture under an inert atmosphere to 150 to 260° C. with removal of condensation water. The reaction may be carried out in the presence of an esterification catalyst and is considered complete when the desired hydroxyl and acid values are obtained.

The polyester polyols preferably possess a branched structure. Branched polyesters are conventionally obtained through condensation of polycarboxylic acids or reactive derivatives thereof, such as the corresponding anhydrides or lower alkyl esters, with polyalcohols, when at least one of the reactants has a functionality of at least 3.

The polyester polyol should contain a sufficiently high amount of cyclic moieties to provide coatings of considerable hardness. Preferably, these cyclic moieties belong to the polycarboxylic components and are provided by cycloaliphatic or/and aromatic polycarboxylic acids or reactive derivatives thereof. To impart sufficient hardness, the molar ratio of the acyclic aliphatic polycarboxylic acids to the total of the polycarboxylic acids is preferably less than 0.3:1, more preferably less than 0.1:1. Further, the molar ratio of the cycloaliphatic polycarboxylic acids to the total of the polycarboxylic acids is typically in the range from 0.3:1 to 1:1, more preferably from 0.45:1 to 1:1

Examples of suitable cycloaliphatic polycarboxylic acids or reactive derivatives thereof are tetrahydrophthalic acid, tetrahydrophthalic anhydride, hexahydrophthalic acid, hexahydrophthalic anhydride, methyl hexahydrophthalic acid, methyl hexahydrophthalic anhydride, dimethylcyclohexane dicarboxylate, 1,4-cyclohexane dicarboxylic acid, 1,3-cyclohexane dicarboxylic acid, and mixtures thereof. Hexahydrophthalic anhydride and 1,4-cyclohexane dicarboxylic acid are preferred.

Examples of aromatic polycarboxylic acids and reactive derivatives thereof are phthalic acid, phthalic anhydride, isophthalic acid, terephthalic acid, 5-tert. butyl isophthalic acid, trimellitic anhydride, and mixtures thereof.

Examples of acyclic aliphatic polycarboxylic acids or reactive intermediates thereof are maleic acid, maleic anhydride, fumaric acid, succinic acid, succinic anhydride, dodecenyl succinic anhydride, dimethyl succinate, glutaric acid, adipic acid, dimethyl adipate, azelaic acid, and mixtures thereof. Adipic acid is preferred. Optionally, up to 20 wt. % of the acyclic aliphatic polycarboxylic acid is used in the preparation of the polyester polyol.

Up to 40 wt. % monocarboxylic acids, based on all monomers used for the preparation of the polyester polyol, preferably $C_4$–$C_8$ monocarboxylic acids, are also preferably among the reactants used to produce the polyester polyol. More preferably, 5 to 30 wt. % of monocarboxylic acids are used.

Examples of the $C_4$–$C_{18}$ monocarboxylic acids include pivalic acid, hexanoic acid, heptanoic acid, octanoic acid, nonanoic acid, 2-ethyl hexanoic acid, isononanoic acid, decanoic acid, lauric acid, myristic acid, palmitic acid, isostearic acid, stearic acid, hydroxystearic acid, benzoic acid, 4-tert. butyl benzoic acid, and mixtures thereof.

The one or more polyalcohol reactant(s) used to form the polyester can be cyclic or acyclic or a mixture thereof. Triols are preferred polyalcohols. They can be used as the sole alcohol component but suitable polyesters can also be prepared from mixtures of triols or from mixtures of one or more triol with other OH-containing compositions, such as monoalcohols, diols, tetraols, and mixtures thereof. Preferably, from 10 to 60 wt. % of triol is used in the preparation of the polyester polyol, more preferably from 20 to 50 wt. %, most preferably from 30 to 40 wt. %.

Suitable triols are $C_{3-12}$ triols. Examples of triols are trimethylol propane, trimethylol ethane, glycerol, and 1,2, 6-hexanetriol. Trimethylol propane and trimethylol ethane are preferred.

Suitable diols are $C_2$–$C_{15}$ diols. Examples of diols are ethylene glycol, 1,2-propylene glycol, 1,3-propylene glycol, 2-methylpropane-1,3-diol, neopentyl glycol, 2-butyl-2-ethyl-1,3-propane diol, cyclohexane-1,4-dimethylol, the monoester of neopentyl glycol and hydroxypivalic acid, hydrogenated Bisphenol A, 1,5-pentanediol, 3-methylpentanediol, 1,6-hexanediol, 2,2,4-trimethyl pentane-1,3-diol, and dimethylol propionic acid. Neopentyl glycol, 2-butyl-2-ethyl-1,3-propane diol, cyclohexane dimethylol, dimethylol propionic acid, and the monoester of neopentyl glycol and hydroxypivalic acid are preferred. Up to 20 wt. % of the diol may be used in the preparation of the polyester polyol.

Suitable tetraols are $C_{4-12}$ tetraols. Examples of tetraols are pentaerythritol and di-trimethylolpropane. Up to 20 wt. % of the tetraol may be used in the preparation of the polyester polyol.

Suitable monoalcohols are, for example, $C_6$–$C_{18}$ monoalcohols. Specific examples are cyclohexanol, 2-ethylhexanol, stearyl alcohol, and 4-tert. butyl cyclohexanol. Up to 20 wt. % of the monoalcohol may be used in the preparation of the polyester polyol.

To form the polyester, a combination of triol and monocarboxylic acid can also be used in the form of preformed glycidyl esters of $C_5$–$C_{15}$ monocarboxylic acids, for example the glycidyl esters of branched $C_9$–$C_{11}$ monocarboxylic acids, commercially available as Cardura E10 from Shell.

The polyurethane polyols for the film forming binders and coating compositions of the invention have at least one cyclic moiety. Preferably, the polyurethane polyols have a hydroxyl number below 350, more preferably in the range from 50 to 350, even more preferably in the range of 50 to 250. Further, the glass transition temperature Tg of the polyurethane polyol is higher than the Tg of the polyester polyol.

The polyurethane polyol may be, for example, the reaction product of a 2- to 5-functional polyisocyanate and a polyalcohol having at least 2 hydroxyl groups, or the reaction product of a polyamine and a cyclic carbonate. The reactants and the molar ratios of the reactants are chosen in such a way that they provide a reaction product having a number of residual hydroxyl groups. The cyclic moieties in the polyurethane polyol can be aromatic, cycloaliphatic, heterocyclic or mixtures thereof. Although polyurethane polyols having the cyclic moieties solely in the polyalcohol reactant(s) are within the scope of the invention, it is preferred that the cyclic moieties are present in the isocyanate reactant(s) of the polyurethane. Also preferred polyurethanes are those in which both the isocyanate reactant(s) and the polyalcohol reactant(s) contain cyclic structures.

The 2- to 5-functional polyisocyanate is preferably isophorone diisocyanate, tetramethylxylene diisocyanate, methylene bis(4-cyclohexyl isocyanate), norbornane diisocyanate, isocyanurate trimer of isophorone diisocyanate, the reaction product of 3 moles of m-tetramethylxylene diisocyanate with 1 mole of trimethylol propane, the reaction product of 3 moles of toluene diisocyanate with 1 mole of trimethylol propane, toluene diisocyanate, the isocyanurate of hexamethylene diisocyanate, the uretdion of isophorone diisocyanate, the uretdion of hexamethylene diisocyanate, the allophanate of hexamethylene diisocyanate, and mixtures thereof. Particularly preferred are the isocyanurate trimer of isophorone diisocyanate, methylene bis(4-cyclohexyl isocyanate), and the reaction product of 3 moles of m-tetramethylxylene diisocyanate with 1 mole of trimethylol propane. Preferably, from 20 to 80 wt. % of polyisocyanate is used in the preparation of the polyurethane polyol, more preferably from 30 to 70 wt. %.

The polyalcohol is preferably selected from the group of diols and triols.

The diol preferably is selected from the group of ethylene glycol, 1,2-propane diol, 1,3-propane diol, 1,3-butane diol, 2-methyl-1,3-propane diol, 2-ethyl-2-butyl-1,3-propane diol, 2,2,4,-trimethyl-1,3-pentane diol, 2-ethyl-1,3-hexane diol, neopentyl glycol, cyclohexane dimethanol, hydrogenated Bisphenol A and mixtures thereof. Also preferred diols are low molecular (Mn<500) condensates of dicarboxylic acids and monomeric diols, for example, prepared from 1 mole of hexahydrophthalic anhydride and 2 moles of 2-butyl-2-ethyl-1,3-propanediol. Up to 70 wt. % of diol is used, preferably from 20 to 65 wt. %.

Triols preferred for use as the polyalcohol are glycerol, trimethylol propane, trimethylol ethane or mixtures thereof. Up to 25 wt. % of triols may be used, preferably 1 to 20 wt. %

Optional up to 30 wt. % of further reactant(s) for preparation of the polyurethane polyol may be used, such as $C_1$–$C_{18}$ monoalcohols whereby the molar ratio of monoalcohol to diol and/or triol component is less than 2, $C_2$–$C_{25}$ primary or secondary monoamine compounds, optionally substituted with a hydroxyl group, whereby the molar ratio of the monoamine to diol and/or triol is lower than 2, and $C_2$–$C_{25}$ diamine compounds comprising primary and/or secondary amine groups, whereby the molar ratio of the diamine to diol and/or triol is lower than 2.

Suitable monoalcohols are, for example, methanol, ethanol, butanol, 2-ethyl hexanol, cyclohexanol, benzyl alcohol, stearyl alcohol and mixtures thereof.

Suitable monoamines are, for example, butyl amine, dibutyl amine, isopropanol amine, N-methyl ethanol amine, benzyl amine, and mixtures thereof.

Suitable diamines are, for example, isophorone diamine, cyclohexane diamine, propylene diamine, piperazine, aminoethyl piperazine, and mixtures thereof.

For the preparation of the polyurethane polyol the ratio of hydroxyl groups and, optionally amine groups, to isocyanate groups ranges from 1.2 to 3.

It is preferred that the number average molecular weight (Mn) of the polyurethane polyol is less than 5000, most preferred are polyurethane polyols having a Mn of less than 3000, as determined by gel permeation chromatography using polystyrene or polypropylene glycol as a standard. The degree of molecular dispersion, i.e., the ratio of Mn to Mw, preferably is in the range of 1.1 to 5, ranges from 1.1 to 3 being preferred particularly.

The synthesis of the polyurethane polyols of the invention preferably is carried out at a temperature of 125° C. or less, most preferably in the range from 15° C. to 100° C. The components may optionally be reacted in the presence a polyurethane catalyst, for example, organic tin compounds, such as, dibutyltin dilaurate or tertiary amine, such as, triethylenediamine.

One embodiment of the invention is a coating composition comprising a film forming binder as described above and a crosslinker. Typically, the crosslinker is present as 20 to 80 wt. % of the coating compositions on solids, preferably from 20 to 60 wt. % on solids, more preferably from 20 to 40 wt. % on solids.

The solids content of the coating composition is typically 30 to 80 wt. %, preferably from 50 to 70 wt. %.

A further embodiment of the current invention is a process for curing a coating composition of the above-described type. Typically, curing occurs at between 0° C. and 80° C.; however, the process can be carried out at higher temperatures. Higher temperatures are frequently desired when the crosslinker is blocked.

Examples of suitable crosslinkers are polyisocyanates, as well as other hydroxyl group-reactive crosslinking agents such as blocked polyisocyanates and/or aminoplast resins, and mixtures thereof.

Polyisocyanates useful herein comprise compounds having two or more isocyanate groups. Examples of suitable polyisocyanates include monomeric polyisocyanates, as well as ureas, biurets, allophanates, uretdion dimers and isocyanurate trimers of isocyanate compounds, and mixtures thereof. Any suitable organic polyisocyanate such as an aliphatic, cycloaliphatic, araliphatic or aromatic polyisocyanate can be used either singly or in mixtures of two or more.

Suitable aromatic isocyanates include toluene diisocyanate, the adduct of 3 moles of toluene diisocyanate and 1 mole of trimethylol propane (commercially available from Bayer as Desmodur L) and diphenyl methane-4,4'-diisocyanate (MDI).

Suitable cycloaliphatic polyisocyanates include methylene bis(4-cyclohexyl isocyanate), isophorone diisocyanate, and the isocyanurate trimer of isophorone diisocyanate (available from Hüls as Vestanat T1890).

Suitable aliphatic polyisocyanates include hexamethylene diisocyanate, norbornane diisocyanate, 2,2,4-trimethylhexamethylene diisocyanate, the uretdion dimer of hexamethylene diisocyanate, the allophanate of hexamethylene diisocyanate, the biuret of hexamethylene diisocyanate, and the isocyanurate trimer of hexamethylene diisocyanate.

Examples of araliphatic polyisocyanates include para- and meta-tetramethylxylene diisocyanate, xylene diisocyanate, and the adduct of m-tetramethylxylene diisocyanate (3 moles) and trimethylol propane (1 mole).

Particularly preferred polyisocyanates are the biuret of hexamethylene diisocyanate, the uretdion dimer of hexamethylene diisocyanate, the allophanate of hexamethylene diisocyanate, the isocyanurate trimer of hexamethylene diisocyanate, the isocyanurate trimer of isophorone diisocyanate, the adduct of 3 moles of m-tetramethylxylene diisocyanate and 1 mole of trimethylol propane, the adduct of 3 moles of toluene diisocyanate and 1 mole of trimethylol propane, and mixtures thereof.

The NCO:OH ratio of the coating composition ranges from 0.5 to 3, preferably from 0.75 to 2, more preferably from 0.75 to 1.5.

The coating compositions usually contain one or more catalyst and optionally one or more retarders. Well known catalysts for the reaction of polyols and isocyanate hardeners are organotin compounds, such as dibutyltin dilaurate and tertiary amine compounds such as triethylene diamine. Known retarders for the same reaction are compounds such as pentanedione, acetic acid, tertiary alcohols and mercapto compounds.

The coating compositions of the invention are typically applied by spraying but also other known methods of application can be utilized, for example, brushing dipping or rolling. For achieving a suitable formulation and application viscosity solvents may be added. Suitable solvents include aliphatic, cycloaliphatic and aromatic hydrocarbon solvents, oxygenated solvents such as ethyl acetate, butyl acetate, hexyl acetate, ethoxyethyl propionate, propylene glycol monomethylether acetate, acetone, methyl ethyl ketone, methyl amyl ketone, ethyl amyl ketone, propylene glycol monomethylether and mixtures of these and/or other solvents.

The coating compositions may also contain pigments. Inorganic as well as organic pigments can be used. Typical additives may also be used in coating compositions of the current invention, including surfactants, anti-oxidants, ultraviolet light absorbers, stabilizers, pigment dispersants, rheology control agents and levelling agents.

The coating composition of the present invention may be applied to any substrate. The substrate may be, for example, metal, plastic, wood, glass or another coating layer. The other coating layer may be comprised of the coating composition of the current invention or it may be a different coating composition. The coating compositions of the current invention show particular utility as clearcoats (over base coats), pigmented topcoats, primers, and fillers. The compositions are particularly suitable for refinishing motor vehicles and transportation vehicles and in finishing large transportation vehicles such as trains, trucks, buses, and airplanes.

In actual practice, the Viscosity measurements for the prepared polyester polyols and polyurethane polyols were carried out on an Epprecht rotation viscosimeter model Rheomat 15 (ex Contraves AG) using a C-spindle at a shear rate of 3.85 s$^{-1}$.

Tg measurements were carried out as follows. A sample of a polymer was dried for 16 hours at 100° C. in a vacuum oven. In an aluminum standard DSC cup was placed 4 to 5 mg of the dried polymer. Analysis of the sample took place in TA instruments MDSC 2950. Heat curve for the polyester polyol was –50 to 150° C. at a rate of 5° C./min. Heat curve for the polyurethane polyol was 0 to 150° C. at a rate of 5° C./min.

The viscosity of the coating compositions was measured in a DIN flow cup number 4 according to DIN 53211-1987. The viscosity is reported in seconds.

Potlife: For the purposes of this disclosure, potlife is the time between the initial mixing of all components and the doubling of the viscosity (based on initial viscosity at time of mixing).

Drying: A coating is "dust dry" when a cotton wool wad, dropped on the paint, can be easily blown off. A coating is "touch dry" when the mark from firm pushing with the thumb disappears after 1 or 2 minutes.

Hardness: Hardness was measured using ISO 1522 with the exception that a steel plate, treated as indicated in the examples, was used instead of a glass plate.

Gloss: Gloss is measured according to ISO 2813:1994. The gloss is expressed in Gloss units.

Enamel Hold Out (EHO): EHO is a determination of the total visual appearance. A panel of at least 3 people rates each sample on a scale of 1 to 10 (1=very bad appearance, 10=excellent appearance) for visual appearance. The determination takes into account, gloss, wrinkling, flow and image clarity/distinctness of image. The average number will give the EHO.

Solvent resistance: Panels are exposed to gasoline, xylene or methyl ethyl ketone. The time required to soften the paint film to a pencil hardness of 2b gives the resistance. Measurements are carried out after 1 and/or 7 days drying.

Flexibility: Flexibility is measured according to ISO 1520. Impact depth gives a value for flexibility.

Polishability: A surface of 10×5 cm is sanded with polishing paper SF (available from 3M), then hand polished with cotton wool and Finess it (available from 3M). After cleaning the surface with degreaser M600 (available from Akzo Nobel Coatings Sassenheim, the Netherlands) the 20° Gloss is measured. Compared to the untreated (original) gloss value the percentage gloss regain gives a value for polishability.

The Distinctness of Image (DOI) is determined by projecting a standard (original) image on a coating with a Portable Distinctness of Reflected Image Meter, #1792, from Ati Systems Inc. The sharpness of the reflected image and of the original image is compared. If the reflected image is (nearly) as sharp as the original image, the DOI of the coating is high. If the reflected image is much less sharp than the original image, the DOI of the coating is low.

EXAMPLE 1

(Polyester polyol A)

Into 10 liter reactor fitted with a stirrer, thermometer, Dean-Stark water separator, packed column and nitrogen inlet tube were charged:

680 g of 1,4-dimethanol cyclohexane, 2873 g of hexahydrophthalic anhydride, and 1595 g of 3,5,5-trimethyl hexanoic acid (isononanoic acid).

The contents, with stirring and under a nitrogen atmosphere, were heated to 165° C. and maintained at this temperature for 2 hours.

Subsequently, 2532 g of trimethylol propane were added to the reactor and the temperature of the reaction mixture was raised to 230° C. The reaction water was distilled off at a rate such that the temperature at the top of the packed column did not exceed 102° C., and the reaction was run at 230° C. until 460 g of water had been collected.

The reaction mixture was then cooled to 175° C., and the packed column was replaced with an unpacked Vigruex column. After the addition of 400 g xylene, the reaction was continued azeotropically under xylene return until an acid value of 9,3 (mg KOH/G) was obtained in the solid reaction product.

Next, the reaction mixture was cooled to 180° C., and 320 g of the glycidyl ester of a 1,1-disubstituted branched decane monocarboxylic acid (commercially available under the trade designation Cardura E from Shell) were added. The reaction mixture was maintained at 180°C. for a period of 2 hours, then cooled to 130° C. and diluted with xylene.

Obtained was a polyester polyol solution having a solids content of 70%, a viscosity of 580 mPa.s at 20° C., an acid value of 0.2, a hydroxyl number of 160, an Mn of 1090 and Mw of 3140 (as measured by gel permeation chromatography using polystyrene as a standard). The polyester polyol had a Tg of −3° C.

EXAMPLE 2
(Polyester polyol B)

Into a 10 liter round bottom reaction vessel equipped with a stirrer, packed column, condenser, heating mantle, thermometer, and nitrogen inlet, were charged 2608 g of hexahydrophthalic anhydride, 2981 g of trimethylol propane, 2015 g of isononanoic acid, 195 g of phthalic anhydride, and 9.2 g of an aqueous solution comprising 85% phosphoric acid.

The reaction mixture was heated under a nitrogen stream of 10 liter/hour. The temperature of the mixture was gradually raised to 240° C. The reaction water was distilled off at a rate such that the temperature at the top of the packed column did not exceed 103° C. After the reaction was run at 240°C. for one hour the nitrogen stream was increased to 50 liter/hour and the reaction continued at 240° C. until an acid value of 9.3 was reached. The reaction mixture was then cooled to 130°°C. and diluted with 1817 g of butylacetate.

A polyester polyol solution was obtained having a solids content of 80.5.%, a viscosity of 7.5 Pa.s measured at 20°C., an acid value or 9.3 and a hydroxyl value of 145 both based on solids. The polyester polyol had a Tg of −2° C. The polyester polyol had an Mn of 1900 and an Mw of 4500 (as measured by gel permeation chromatography using polystyrene as a standard).

EXAMPLE 3
(Polyester polyol C)

A polyester polyol was prepared in a 5 liter reaction vessel according to the equipment set up and the procedures of Example 2 using 683 g of hexahydrophthalic anhydride, 656 g of phthalic anhydride, 1483 g of trimethylol propane, 979 g of isononanoic acid, and 4.47 g of an aqueous solution comprising 85% phosphoric acid, and 886 g butylacetate.

A polyester polyol solution was obtained having a solids content of 80.1%, a viscosity of 8.75 Pa.s measured at 20° C., and an acid value of 10.4 and a hydroxyl value of 157 both based on solids. The polyester polyol had a Tg of 3° C. The polyester polyol had a Mn of 1790 and a Mw of 3350 (as measured by gel permeation chromatography using polystyrene as a standard).

EXAMPLE 4
(Polyester polyol D)

A polyester polyol was prepared in a 5 liter reaction vessel according to the equipment set up and the procedures of Example 2 using 1290 g of hexahydrophthalic anhydride, 403 g of cyclohexane dimethanol, 1366 g of trimethylol propane, 442 g of isononanoic acid, and 1090 g of butylacetate.

A polyester polyol solution was obtained having a solids content of 74.3%, a viscosity of 2.0 Pa.s measured at 20° C., an acid value of 2.6 and a hydroxyl value of 285 both based on solids. The polyester polyol had a Tg of −3° C. The polyester polyol resin had a Mn of 650 and a Mw of 1180 (as measured by gel permeation chromatography using polypropylene glycol as a standard).

EXAMPLE 5
(Polyurethane polyol A)

Into a two liter round bottom reaction vessel equipped as in Example 2 were charged 426 g of 2-butyl-2-ethyl-1,3-propanediol, 440 g of butyl acetate, and 0.11 g of dibutyltin dilaurate.

The mixture was heated under a nitrogen atmosphere to 55° C. Then 934 g of a 70% solution in butylacetate of the isocyanurate trimer of isophorone diisocyanate (available as Vestanat T 1890 E from Hüls) were added over a period of 60 minutes. During this addition the temperature was not allowed to exceed 70° C. After complete addition the mixture was post-reacted at 70° C. until the NCO-content, calculated on solid ingredients, dropped below 0.1 wt. %. After cooling, a clear polyurethane polyol solution was obtained having a viscosity (20° C.) of 2.8 Pa.s, a solids content of 60.8% (determined at 150° C. for 60 minutes) and a hydroxyl value of 136 calculated on solids. Using polystyrene as a standard, gel permeation chromatography (GPC) indicated an Mn of 1300 and a Mw 1800. The polyurethane polyol had a Tg of 81° C.

EXAMPLE 6
(Polyurethane polyol B)

Into a 2 liter round bottom reaction vessel equipped in the same manner as described in Example 5, a polyurethane polyol was prepared from 320 g of 2-butyl-2-ethyl-1,3-propanediol, 134 g of trimethylolpropane, 303g of butylacetate, and 0.12 g of dibutyltin dilaurate.

Then 1050 g of Vestanat T 1890 E were added over a period of 60 minutes. During this addition, the temperature was not allowed to exceed 70° C. until the NCO-content, calculated on solid ingredients, dropped below 0.1 wt. %. After cooling, a clear polyurethane polyol solution was obtained having a solids content of 60.5%, a viscosity of 10 Pa.s at 20° C., and a hydroxyl value of 155, calculated on solids. GPC indicated an Mn of 1150 and an Mw of 2000 with polystyrene as standard. The polyurethane polyol had a Tg of 82° C.

EXAMPLE 7
(Polyurethane polyol C)

A polyurethane polyol was prepared according to the equipment set up and the procedures of Example 5 using 627 g of 2,2,4-trimethyl-1,3-pentanediol, 563 g of 4,4'-methylene-bis-(cyclohexyl isocyanate) commercially available from Bayer as Desmodur W, 297 g of butylacetate, and 0.12 g of dibutyltin dilaurate.

Cooling the reaction mixture after the NCO-content, calculated on solid ingredients, had dropped below 0.1 wt. % gave a semi-solid product having a solids content of 80.2% and a hydroxyl value of 202, calculated on solids. GPC indicated an Mn of 750 and an Mw of 900 with polystyrene as standard. The polyurethane polyol had a Tg of 36° C.

EXAMPLE 8
(Polyurethane polyol D)

A polyurethane polyol was prepared according to the equipment set up and the procedures of Example 5 using 361 g of 2-butyl-2-ethyl-1,3-propanediol, 900 g of an 80% solution in a 50/50 mixture of butyl acetate and methyl ethyl ketone of the addition product of 1 mole of trimethylol propane and 3 moles of tetramethyl xylylene diisocyanate (commercially available from Cytek as Cythane 3160), 540 g of butylacetate, and 0.11 g of dibutyltin dilaurate.

A colorless polyurethane polyol solution was obtained having a solids content of 60.5%, a viscosity of 2.2 Pa.s at 20° C. and a hydroxyl value of 117, calculated on solids. The resin had a Tg of 60° C.

EXAMPLE 9
(Polyurethane polyol E)

A polyurethane polyol was prepared according to the set up and the procedures of Example 5 using 762 g of a 76% solution in butyl acetate of a low molecular weight polyester diol made from hexahydrophthalic anhydride (1 mole) and 2-butyl-2-ethyl-1,3-propanediol (2 moles) and having an acid value of 4.2, 454 g of Vestanat T1890 E, 433 g of butylacetate, and 0.30 g of dibutyltin dilaurate.

A polyurethane polyol solution was obtained having a solids content of 49.4%, an acid value of 2.3 and a hydroxyl value of 105 both calculated on solid resin, a viscosity of 0.32 Pa.s, an Mn of 1010 and an Mw of 1480.

Polypropylene glycol was used as standard for gel permeation chromatography. The resin had a Tg of 24° C.

EXAMPLE 10
(polyurethane polyol F)

A polyurethane polyol was prepared in a 1 liter reaction vessel according to the set up and procedures of Example 5 using 161 g of 2-butyl-2-ethyl-1,3-propane diol, 398 g of Vestanat T1890E, 240 g of butylacetate, and 0.06 g of dibutyltin dilaurate.

A polyurethane polyol solution was obtained having a solids content of 55%, a hydroxyl value of 110 calculated on solid resin, a viscosity of 1.1 Pa.s at 23°°C., an Mn of 1170 and an Mw of 2370. Polypropylene glycol was used as standard for gel permeation chromatography. The polyurethane polyol had a Tg of 86° C.

EXAMPLE 11
(Polyurethane polyol G)

Into a 1 liter round bottom reaction vessel equipped in the same manner as described in Example 5 were charged 101 g of benzyl alcohol, 67 g of butylacetate, and 0.05 g of dibutyltin dilaurate.

After heating this mixture under a nitrogen atmosphere to 55° C., 494 g of Vestanat T1890E were added over a period of 60 minutes. During this addition the temperature was not allowed to exceed 70° C. After complete addition, 124 g of butylacetate were added and the reaction mixture was post heated at 70° C. for a period of 2 hours. Then 63 g of trimethylol propane were added and the reaction mixture was further held at 70° C. until the NCO-content dropped below 0.1%.

A clear polyurethane polyol solution was obtained having a solids content of 60.9%, an hydroxyl value of 103 calculated on solid resin, a viscosity of 3.35 Pa.s at 20° C., an Mn of 1000 and an Mw of 1550. Polypropylene glycol was used as standard for gel permeation chromatography. The polyurethane polyol had a Tg of 83° C.

EXAMPLE 12–16 AND COMPARATIVE EXAMPLES A–B

Examples 12–16 provide examples of unpigmented coating compositions according to the present invention. Examples A and B provide comparative unpigmented coating compositions. Examples 12–16 and Comparative Examples A and B were formulated as detailed in Table I.

TABLE I

Unpigmented Coating Compositions: Formulations

| Example | A | 12 | B | 13 | 14 | 15 | 16 |
|---|---|---|---|---|---|---|---|
| Polyester polyol A[6] | — | — | 42.7 | 36.3 | 29.9 | 29.9 | 29.9 |
| Polyester polyol B | 60 | 50 | — | — | — | — | — |
| Polyurethane polyol A | — | — | — | — | — | 19.4 | — |
| Polyurethane polyol B | 0 | 20.2 | — | 9.7 | 19.4 | — | — |
| Polyurethane polyol C | — | — | — | — | — | — | 14.5 |
| acetic acid | 1.5 | 1.5 | — | — | — | — | — |
| dibutyl tin dilaurate (10% in butylacetate) | 1.45 | 1.32 | 0.10 | 0.10 | 0.10 | 0.10 | 0.10 |
| BYK 306[3] | 0.20 | 0.20 | 0.20 | 0.20 | 0.20 | 0.20 | 0.20 |
| Thinner 1[1] | 40.8 | 36.1 | — | — | — | — | — |
| Thinner 2[2] | — | — | 42.0 | 39.0 | 35.5 | 35.1 | 40 |
| Desmodur N 3390[4] | 34.5 | 31.5 | — | — | — | — | — |
| Desmodur N75[5] | — | — | 25.2 | 28.9 | 29.6 | 26.8 | 30.4 |
| ratio NCO:OH | 1.25 | 1.25 | 1.0 | 1.0 | 1.0 | 1.0 | 1.0 |
| solids content % | 57.3 | 57.3 | 52.6 | 52.6 | 52.6 | 52.6 | 54.6 |

[1]Thinner 1 = methyl amyl ketone: ethyl amyl ketone in a 1:1 mixture
[2]Thinner 2 = butylacetate: Solvesso 100: propylene glycol monomethylether acetate in a 1:1:1 mixture
[3]BYK 306: a silicon flow additive available from BYK-Chemie, Wesel, Germany
[4]Desmodur N 3390: a triisocyanurate based on hexamethylene diisocyanate available from Bayer AG, 90% solids in butyl acetate
[5]Desmodur N75 : a biuret-type polyisocyanate based on hexamethylene diisocyanate available frnm Bayer AG, 75% solids in propylene glycol monomethylether acetate/xylene (1/1)
[6]The polyester polyol A has a solids content of 91% in butyl acetate instead of 70% in xylene The clear coating compositions of Examples 12–16 and Comparative Examples A and B were sprayed to a dry-layer thickness of 60 microns onto steel panels. The steel panels had been precoated with a two-component polyurethane primer (Autocryl®3+1 filler available from Akzo Nobel Coatings, Sassenheim, the Netherlands) and a metallic basecoat (Autobase® AM basecoat available from Akzo Nobel Coatings, Sassenheim, the Netherlands ). The coatings were allowed to dry at 23° C. and a relative humidity of 55%. The evaluation results are presented in Table II.

The results in Table II show that coating compositions using film forming binders according to the current invention provide shorter drying times and improved polishability.

TABLE II

Unpigmented Coating Compositions: Evaluation

| Example | A | 12 | B | 13 | 14 | 15 | 16 |
|---|---|---|---|---|---|---|---|
| - Viscosity (sec.) | 17.1 | 19.0 | 16.8 | 18.2 | 19.7 | 18.8 | 17.7 |
| - Potlife (min.) | 100 | 95 | 65 | 70 | 70 | 75 | 85 |
| - Drying | | | | | | | |
| Dust dry (min.)- | 66 | 54 | 112 | 63 | 42 | 49 | 67 |
| Touch dry (min.- | 195 | 166 | 192 | 167 | 154 | 163 | 157 |
| - Gloss (units) | | | | | | | |
| 20° angle | 83 | 83 | 85 | 86 | 86 | 85 | 85 |
| 60° angle | 90 | 91 | 92 | 91 | 92 | 92 | 91 |
| - Polishability after 1 day (20° gloss retention) | 81% | 89% | 45% | 76% | 83% | 86% | 67% |
| - Xylene resistance | | | | | | | |
| after 1 day (sec.) | 60 | 60 | 30 | 60 | 30 | 30 | 120 |
| 7 days (sec.) | >300 | >300 | >300 | >300 | >300 | >300 | >300 |
| - Hardness | | | | | | | |
| 1 day 23° C. (sec) - | 32 | 58 | 31 | 37 | 48 | 39 | 35 |
| 7 days 23° C. (sec) - | 87 | 89 | 39 | 49 | 54 | 43 | 39 |
| 45 min 60° C. (sec) - | 20 | 35 | 35 | 43 | 56 | 41 | 36 |
| - DOI | 85 | 89 | 80 | 84 | 79 | 87 | 90 |
| Flexibility (after 7 days in mm) | 11.0 | 10.3 | 9.0 | 9.2 | 8.8 | 9.0 | 10.1 |

EXAMPLE 17 AND COMPARATIVE EXAMPLE C

Example 17 and Comparative Example C were formulated as detailed in Table III.

The pigmented coating compositions of Example 17 and Comparative Example C were applied with a spray gun in one light coat and one full coat. A flash off of 2 to 5 minutes between two coats was allowed. The pigmented samples were sprayed directly over a coating of Autocryl®3110 filler (available from Akzo Nobel Coatings, Sassenheim, the Netherlands). The evaluation results are presented in Table IV.

The results in Table IV demonstrate the improved drying and hardness provided by coating compositions comprising film forming binders according to the current invention.

TABLE III

Pigmented Coatings: Formulations

| Example | C | 17 |
|---|---|---|
| Kronos 2160[1] | 70.0 | 70.0 |
| Disperbyk 163[2] | 2.1 | 2.1 |
| Polyester polyol B | 21.0 | 22.0 |
| Butylacetate | 3.5 | 3.5 |
| Solvesso 100[3] | 3.4 | 3.4 |
| Polyester polyol B | 38.3 | 30.3 |
| Polyurethane polyol A | — | 10.6 |
| DBTL (10% in butylacetate) | 0.8 | 0.8 |
| BYK 306[4] | 0.3 | 0.3 |
| Butylacetate | 10.1 | 9 |
| Solvesso 100[3] | 10.2 | 9 |
| | 160 | 160 |
| Desmodur N3390[5] | 32.2 | 31.6 |
| Butylacetate | 9.6 | 9.1 |
| Ethoxy ethyl propionate | 9.7 | 9.2 |
| ratio NCO:OH | 1.25 | 1.25 |
| solids content % | 70 | 70 |
| VOC (g/l) | 395 | 395 |

[1]Titanium dioxide available from Kronos
[2]Dispersing agent available from BYK-Chemie, Wesel, Germany
[3]Solvent, available from Exxon Chemical
[4]Silicon flow additive, available from BYK-Chemie, Wesel, Germany
[5]A triisocyanurate based on hexamethylene diisocyanate available from Bayer AG, 90% solids in butyl acetate

TABLE IV

Pigmented Coatings: Evaluation

| Example | C | 17 |
|---|---|---|
| Viscosity (seconds) | 17.4 | 17.7 |
| Potlife (minutes) | 150 | 140 |
| Drying | | |
| Dust dry (min.) | 99 | 56 |
| Touch dry (min.) | 335 | 302 |
| EHO | 7.8 | 8.4 |
| 20° angle Gloss | 83 | 84 |
| Hardness | | |
| 1 day 23° C. (sec)- | 43 | 59 |
| 7 days 23° C. (sec)- | 92 | 87 |
| Solvent resistance (seconds) | | |
| Gasoline (1 day) | >300 | >300 |
| Xylene (1 day) | 60 | 60 |
| Xylene (7 days) | >300 | >300 |
| Methyl ethyl ketone (7 days) | 20 | 30 |

What is claimed is:

1. A film forming binder comprising 45 to 99 wt. % of a polyester polyol comprising cycloaliphatic moieties and 55 to 1 wt. % of a polyurethane polyol comprising cyclic moieties where the Tg of the polyurethane polyol is higher than the Tg of the polyester polyol an the Tg of the polyurethane polyol ranges from 10 to 100° C.

2. A film forming binder according to claim 1 wherein the Tg of the polyester polyol ranges from −20 to 20° C.

3. A film forming binder according to claim 1 wherein the difference in Tg between the Tg of the polyurethane polyol and the Tg of the polyester polyol is at least 10° C.

4. A film forming binder according to claim 1 comprising 50 to 95 wt. % of the polyester polyol and 50 to 5 wt. % of the polyurethane polyol.

5. A film forming binder as in claim 1 wherein the polyester polyol is branched.

6. A film forming binder according to claim 5 wherein the polyester polyol is the reaction product of at least one cycloaliphatic polycarboxylic acid or derivative thereof, at least one $C_{3-12}$ triol, and optionally, one or more monoalcohol, polyol, aromatic polycarboxylic acid, acyclic aliphatic polycarboxylic acid, monocarboxylic acid or glycidyl ester of monocarboxylic acid.

7. A film forming binder according to claim 6 wherein the cycloaliphatic polycarboxylic acid is selected from the group of hexahydrophthalic anhydride, 1,4-cyclohexane dicarboxylic acid, and mixtures thereof.

8. A film forming binder according to claim 6 wherein the triol is selected from the group of trimethylol ethane, trimethylol propane, glycerol, 1,2,6-hexanetriol and mixtures thereof.

9. A film forming binder according to claim 6 wherein the molar ratio of the acyclic aliphatic polycarboxylic acids to the total of the polycarboxylic acids is less than 0.3:1 and the molar ratio of the cycloaliphatic polycarboxylic acids to the total of the polycarboxylic acids is in the range from 0.3:1 to 1:1.

10. A film forming binder according to claim 1 wherein the polyurethane polyol having a hydroxyl number below 350 is the reaction product of at least one 2- to 5-functional cyclic polyisocyanate and at least one polyalcohol, and optionally, other monomers.

11. A film forming binder according to claim 10 wherein the cyclic polyisocyanate is selected from the group of the isocyanurate trimer of isophorone diisocyanate, methylene bis(4-cyclohexyl isocyanate), and the reaction product of 3 moles of m-tetramethylxylene diisocyanate with 1 mole of trimethylol propane.

12. A coating composition comprising a film forming binder according to claim 1 and a crosslinker.

13. A coating composition according to claim 12 comprising 20 to 80 wt. % of the crosslinker based on solids.

14. A coating composition according to claim 12 wherein the crosslinker is selected from the group of polyisocyanates.

15. A coating composition according to claim 14 wherein the crosslinker is selected from the biuret of hexamethylene diisocyanate, the uretdion dimer of hexamethylene diisocyanate, the allophanate of hexamethylene diisocyanate, the isocyanurate trimer of hexamethylene diisocyanate, the isocyanurate trimer of isophorone diisocyanate and 1 mole of trimethylol propane, the adduct of 3 moles of toluene diisocyanate and 1 mole of trimethylol.

16. Process for curing a coating composition according to claim 12 comprising reacting the film forming binder and crosslinker.

17. A process according to claim 16 further comprising reacting the film forming binder and crosslinker between 0° C. and 80° C.

18. A clearcoat comprising a coating composition according to claim 12.

19. An automotive refinish comprising a coating composition according to claim 12.

20. A vehicle coating comprising a coating composition according to claim 12.

21. A pigmented topcoat comprising a coating composition according to claim 12.

* * * * *

UNITED STATES PATENT AND TRADEMARK OFFICE
CERTIFICATE OF CORRECTION

PATENT NO. : 6,096,835
DATED : August 1, 2000
INVENTOR(S) : Vandevoorde, et al.

Page 1 of 1

It is certified that error appears in the above-identified patent and that said Letters Patent is hereby corrected as shown below:

Claim 1,
Line 5, change "an" after "polyol" to -- and --.

Signed and Sealed this

Fourteenth Day of August, 2001

*Attest:*

*Attesting Officer*

NICHOLAS P. GODICI
*Acting Director of the United States Patent and Trademark Office*